US011014689B2

(12) United States Patent
Edwards et al.

(10) Patent No.: US 11,014,689 B2
(45) Date of Patent: May 25, 2021

(54) COMMAND INTERPRETER OR COMMAND PARSER BASED CONTROL ARCHITECTURE FOR AIRCRAFT CONTROL, INTERFACE UNITS AND/OR ILLUMINATED PUSHBUTTON SWITCHES

(71) Applicant: Applied Avionics, Inc., Fort Worth, TX (US)

(72) Inventors: Steven A. Edwards, North Richland Hills, TX (US); Craig Jay Coley, Burleson, TX (US); Trang Tran Myers, Keller, TX (US)

(73) Assignee: Applied Avionics, Inc., Fort Worth, TX (US)

( * ) Notice: Subject to any disclaimer, the term of this patent is extended or adjusted under 35 U.S.C. 154(b) by 100 days.

(21) Appl. No.: 16/539,640

(22) Filed: Aug. 13, 2019

(65) Prior Publication Data
US 2020/0050455 A1    Feb. 13, 2020

Related U.S. Application Data

(60) Provisional application No. 62/718,195, filed on Aug. 13, 2018.

(51) Int. Cl.
*B64D 43/00* (2006.01)
*G06F 11/07* (2006.01)
(Continued)

(52) U.S. Cl.
CPC .............. *B64D 43/00* (2013.01); *B64C 19/00* (2013.01); *G05B 15/00* (2013.01); *G06F 11/0757* (2013.01)

(58) Field of Classification Search
None
See application file for complete search history.

(56) References Cited

U.S. PATENT DOCUMENTS 4,654,779 A * 3/1987 Kato .................... G06F 12/1466
711/147
5,179,703 A * 1/1993 Evans ................. G06F 9/45512
703/22
(Continued)

FOREIGN PATENT DOCUMENTS

EP      0606469 B1    12/2000
WO    2018/035096 A1    2/2018

OTHER PUBLICATIONS

Notification of Transmittal of the International Search Report and the Written Opinion of the International Searching Authority, or the Declaration dated Jun. 9, 2020 in connection with International Patent Application No. PCT/US2019/046371, 11 pages.

*Primary Examiner* — Corey S Faherty

(57) ABSTRACT

An aircraft control or interface unit with a programmable controller includes an isolated, non-volatile command memory containing the complete, fixed set of non-compiled, text-format commands used for every application programmed into an instance of the aircraft control or interface unit. A command interpreter automatically and sequentially interprets and executes the command set in a continuous loop, where the command set encompasses all commands necessary for the ability to activate, implement and disable all available input, output and processing capabilities within the hardware configuration of the aircraft control or interface unit. A command parser that process and stores the entire command set into executable commands for automatic and sequential execution in a continuous loop, where the command set encompasses all commands necessary for the ability to activate, implement and disable all available input, output and processing capabilities within the hardware configuration of the aircraft control or interface unit.

20 Claims, 4 Drawing Sheets

(51) Int. Cl.
*B64C 19/00* (2006.01)
*G05B 15/00* (2006.01)

(56) References Cited

U.S. PATENT DOCUMENTS

| | | |
|---|---|---|
| 6,346,892 B1 | 2/2002 | DeMers et al. |
| 7,292,160 B1* | 11/2007 | Wang ................ H03M 7/30 |
| | | 341/51 |
| 2004/0145612 A1 | 7/2004 | Kopitzke et al. |
| 2005/0091036 A1 | 4/2005 | Shackleton et al. |
| 2008/0046873 A1* | 2/2008 | Rumsey ............. G06F 9/44505 |
| | | 717/143 |

* cited by examiner

COMMAND INTERPRETER OR COMMAND PARSER BASED CONTROL ARCHITECTURE FOR AIRCRAFT CONTROL, INTERFACE UNITS AND/OR ILLUMINATED PUSHBUTTON SWITCHES

PRIORITY CLAIM

This application claims priority to U.S. Provisional Patent Application No. 62/718,195 filed Aug. 13, 2018 and entitled COMMAND INTERPRETER BASED CONTROL ARCHITECTURE FOR AIRCRAFT CONTROL, INTERFACE UNITS AND/OR ILLUMINATED PUSH BUTTON SWITCHES. The content of the above-identified patent document is incorporated by reference.

TECHNICAL FIELD

The present disclosure is directed, in general, to communications with an aircraft control, including illuminated pushbutton switches or indicators, or an aircraft interface unit, including data communications devices.

BACKGROUND

Numerous regulations are applicable to the software programming within an aircraft control or interface device, primarily controlled by a strict development regimen dictated by the Federal Aviation Administration's (FAA) DO-178, Software Considerations in Airborne Systems and Equipment Certification specification. The FAA applies DO-178 as the guidance for determining whether software will perform reliably in an airborne environment when certification of a software-controlled product is sought. The FAA requires DO-178 compliance before aircraft containing software-controlled components can fly, with different levels of compliance applicable based on the criticality of the software-controlled system to safety.

SUMMARY

An aircraft control or interface unit with a programmable controller includes an isolated, non-volatile command memory containing the complete, fixed set of non-compiled, text-format commands used for every application programmed into an instance of the aircraft control or interface unit. A command interpreter automatically and sequentially interprets and executes the command set in a continuous loop, where the command set encompasses all commands necessary for the ability to activate, implement and disable all available input, output and processing capabilities within the hardware configuration of the aircraft control or interface unit. A command parser processes the entire command set one time at start-up, converting the command set into a separately stored executable sequence of commands used for the actual control of the capabilities of the unit.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, or in firmware or software executing on hardware, but excluding software without any hardware. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Modern aircraft and military systems increasingly utilize computers and/or processor-controlled systems to manage equipment. When a programmable microcontroller is employed to control or respond to an aircraft component, the above-described regulations and associated qualification requirements are applicable. In order to expedite qualification of new and/or different options for a particular component, the present disclosure describes a command set and command interpreter or parser that configures the microcontroller for a specific one of the myriad possible configurations to be called for any specific application.

Figure 1:
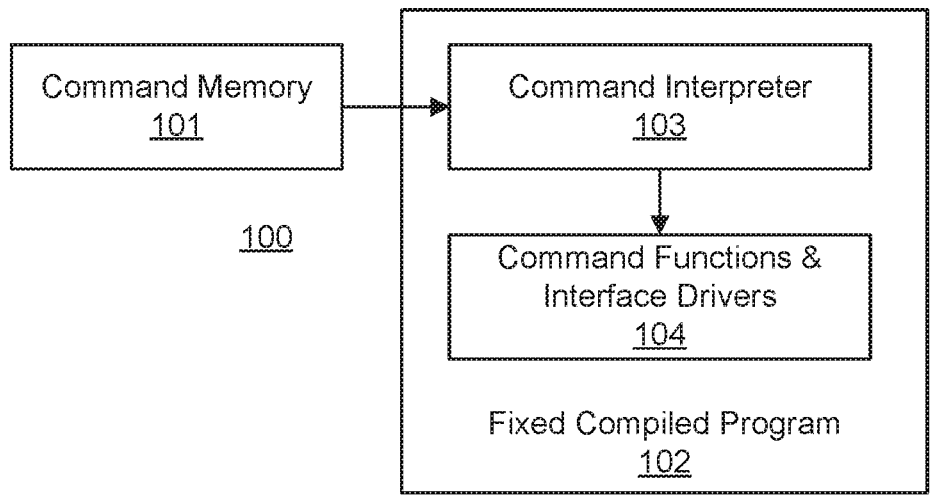
FIGS. 1 and 2 are block diagrams for a command set and command interpreter or command parser based control architecture to be used for aircraft control or interface units according to various embodiments of the present disclosure.
Figure 2:
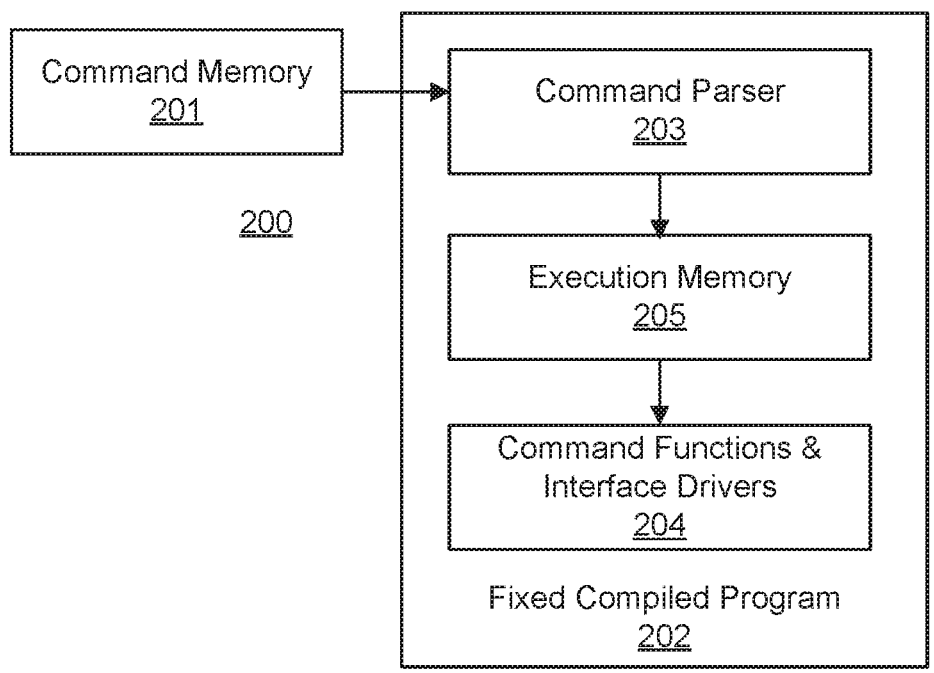

FIGS. 1 and 2 are block diagrams for a command set and command interpreter or command parser based control architecture to be used for aircraft control or interface units according to various embodiments of the present disclosure. As used herein, "aircraft control or interface unit" refers to a hardware device used to enable control of aircraft systems by the flight crew, to provide information regarding the state of such aircraft systems to the flight crew, or both. Examples include illuminated pushbutton switches and indicators of the type described in any of U.S. Pat. Nos. 6,323,598, 6,489,728, 6,650,064, 6,653,798, 6,670,776, 6,737,814, 7,453,218, 7,906,915, 8,222,771, 8,350,493, 8,587,158, and 8,624,442, and data communications devices of the type described in U.S. Patent Application Publication No. 2019/0019638, all of which are incorporated herein by reference. The present disclosure contemplates aircraft control or interface units including a controller. As used herein, "controller" (or, equivalently, "microcontroller") refers to a programmable hardware device normally including a processor, memory (one or both of read-only memory and read/write memory), and input/output ports and/or interface(s) (each of which may be serial or parallel), and typically a hardware timer as well. Those skilled in the art will recognize that both "aircraft control or interface unit" and "controller" refer to structural, hardware devices of type(s) known in the relevant art. Use of the terms "unit" and "controller" within a claim is understood and intended to refer to those known structures, as further modified or enhanced by the features of the claims themselves, and is not intended to invoke 35 U.S.C. § 112(f).

The architecture 100 of FIG. 1 includes a command memory 101 containing the complete command set. In the present disclosure, every application programmed into a controller within an aircraft control or interface unit is implemented with a fixed set of non-compiled, text-format commands that are saved into an isolated, non-volatile command memory 101. The available command set encompasses all commands necessary for the ability to activate, implement and disable all available input, output and processing capabilities within the hardware configuration of the aircraft control or interface unit. By way of example, an "Enable" command sets up and configures an element of the aircraft control or interface system to be used by the application, while a "Disable" command removes an element from the available options for a specific application. Notably, the disable feature may be set up with several different options depending on the requirements of safety criticality. For low criticality options, the command is always available but is not implemented by leaving the command out of the implemented command set. Alternatively, the "Disable" command may be blocked from execution by the initial set up of an application. For high safety criticality applications, the command may be automatically executed as a null command, so that the code included in the application to control the unused element or feature is still activated at least once per command loop cycle with no interaction with the application capability. The null command ensures that no unused code exist when used in high safety criticality applications.

When implemented with a command interpreter, the application command set within command memory 101 is passed to a command interpreter 103 within a fixed compiled program 102 that is common to all applications in different types of aircraft control or interface units. The command interpreter 103 contains the translations and error checking for every valid command, and cycles through the command memory 101 interpreting each command in order. The command interpreter 103 then passes control signals to command functions and interface drivers 104 within the fixed compiled program 102, to execute correspond functions or establish settings.

An interpreted coding language might be viewed as a "scripting language" and therefore deemed insufficiently rigid. Moreover, some consider interpreted systems slow and error prone as compared to parsed and compiled systems, and it is increasingly common in avionics to use extensible markup language (XML) or a similar self-description language to define unique behavioral variables that exist from one system to another while retaining human readability within a highly rigid structure for machine decoding. Accordingly, for some embodiments, parsing and compiling of XML combined with a cyclic redundancy check (CRC) or similar error code may be preferred within a pushbutton switch for avionics. Use of XML as the control schema also allows the product test environment to be very flexible, since the test equipment can generate test sequences based upon the same instructions used by the product itself.

The architecture 200 of FIG. 2 also includes a command memory 201 containing the complete command set. When implemented with a command parser, the application command set within command memory 201 is passed to a command parser 203 within a fixed compiled program 202 that is common to all applications in different types of aircraft control or interface units. The parser 203 contains the translations and error checking for every valid command, and processes the entire command set and places an executable version of the commands into the execution memory 205. Then after the command parser 203 is complete the parsed commands are executed in order to implement the command functions and interface drivers 204 within the fixed compiled program 202, to execute corresponding functions or establish settings.

The software within an aircraft control or interface unit according to the present disclosure is tightly controlled for certifying agencies with a design assurance level (DAL) assigned to each application. The design assurance level is dictated by both formal regulations and the specifications and requirements of the platform. The command set and command interpreter or command parser architecture of the present disclosure therefore allows the compiled interpreter, parser and control software to be developed and validated one time to the highest available safety level, then never changed for a given set of application capabilities. Since the software is fixed and unchanging from application to application, the validation of specific application(s) only needs to cover the certification of the command set implementation and operation to the desired design assurance level.

A command set and command interpreter or command parser based control architecture 100 or 200 for aircraft control or interface units (such as illuminated pushbutton switches or serial data transceivers) provides a flexible configuration that can be applied to multiple different applications by implementing a text based non-compiled fixed command set in combination with a fixed compiled program. This improves the state of the art of avionics units by providing deterministic implementations that simplify the application development and validation, including specifically by providing: an available command set that is fixed and deterministic for all applications; a plain text command set that is not pre-compiled, so that the need for qualification and validation of the compiler and compiler capabilities for the command set is eliminated for any new applications; validation of unique application instances is minimized to usage of the command set for the application specific sequence of commands; assurance of safety and reliability by having the command set in a separate isolated portion of memory from the interpretation and control; no need to develop and validate the fixed compiled program more than one time, with the capability of interpreting or parsing and implementing all full desired command sets; fixed control structure of the compiled program; and identical application execution for all instances by having a table of commands interpreted one at a time, or parsed and stored, then implemented in order within an automatic sequential interpret-execute continuous loop that starts on power up of the aircraft control or interface unit. The implementation of the command set to operate all available hardware capabilities, when combined with a command ability to enable or disable every element, allows the fully developed and validated feature set of the unit to be available for use in any feasible application within the capabilities of the unit without having to revalidate the base design.

Figure 3:
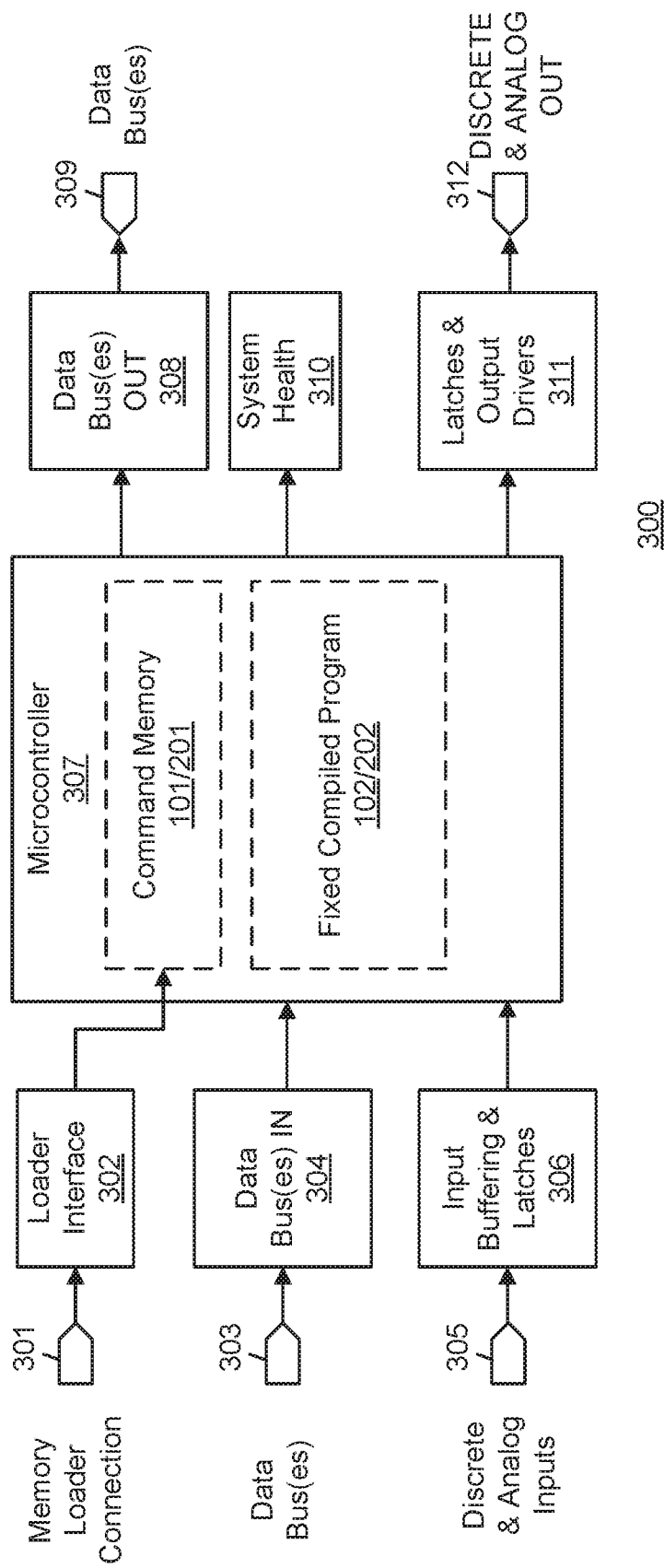
FIG. 3 illustrates a typical hardware configuration for the command set and command interpreter or command parser architecture shown in FIGS. 1 and 2.

FIG. 3 illustrates a typical hardware configuration for the command set and command interpreter or command parser architecture shown in FIGS. 1 and 2. The structure of an aircraft control or interface unit 300 depicted in FIG. 3 is applicable to (for example) both control units and illuminated pushbutton switches. A memory loader connection 301 coupled to a loader interface 302 allows the command set to be loaded into command memory 101/201 within a controller 307. The command set may be loaded, for example, during initial set up as the aircraft control or interface unit 300 is powered from an unpowered state, for example as part of the aircraft being brought into service. Data bus(ses) input connection 303 to data bus(ses) IN buffer 304 and discrete and analog input(s) connection 305 to input buffering and latches 306 also allow digital and analog signals to be passed to controller 307.

Data bus(ses) OUT buffer 308 coupled to data bus(ses) output connection 309 and latches and output drivers 311 coupled to discrete and analog output(s) connection 312 allow the controller 307 to pass signals to other hardware elements of the aircraft control or interface unit 300, such as actuators or the like. A system health watchdog 310 monitors the operation of the controller 307, providing a failsafe for safety purposes.

Figure 4:
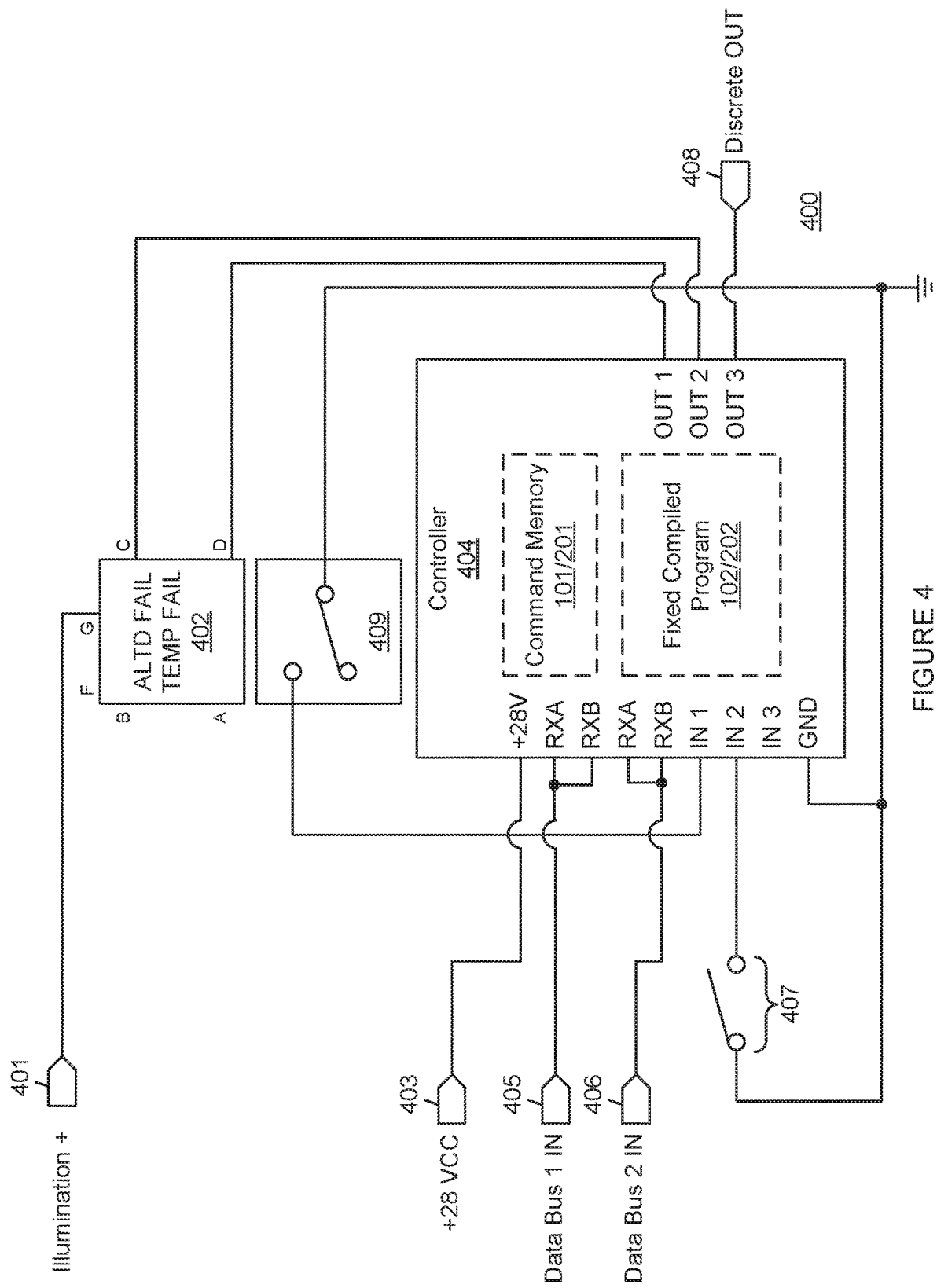
FIG. 4 is a diagram for a typical illuminated pushbutton switch application for the command set and command interpreter or command parser architecture shown in FIGS. 1 and 2.

FIG. 4 is a diagram for a typical illuminated pushbutton switch application for the command set and command interpreter or command parser architecture shown in FIGS. 1 and 2. The illuminated pushbutton switch 400 includes a 28 volts (V) direct current (DC) power input +28 VCC 403 and a ground connection, each coupled to the respective input of controller 404. Data bus 1 IN input 405 and Data bus 2 IN input 406 are each connected to one receiver input of the controller 404 (which are differential receiver inputs tied together in the example shown). One input for the controller 404 is connected to a terminal of mechanical switch 409, and another input for the controller 404 is connected to a weight-on-wheels device 407 (modeled as a switch in the example shown). A common terminal of the mechanical switch 409 is coupled to the ground connection. Outputs for the controller 404 are connected to a sensor failure detector 402, which receives an illumination actuation input ("Illumination +") 401, and to a discrete OUT connection 408 for transmitting control signals to remote components.

Implementation of an illuminated pushbutton switch 400 with the command memory 101/201 and command interpreter 103 or command parser 203 provides a number of enhancements over the current state of the art of traditional avionics illuminated pushbutton switches: application of reconfigurable control(s) that can be adapted during the development phase an aircraft is enabled; a single design configuration can perform different functions by simply loading a different command set; size, weight and space within the crowded cockpit of an aircraft is saved by allowing electronic interface and control capability within the existing space of switch, eliminating the need for external interface unit(s); a single switch can perform multiple functions in addition to the physical mechanical interface with the pilots and crew; and the displayed information of a reconfigurable display may be generated and adapted within the switch to present the current required information.

The exemplary configuration of an illuminated pushbutton switch 400 provides multiple added capabilities based on command memory 101/201 and command interpreter 103 or command parser 203. Information may be received from multiple sources, including the data bus 1 input connection 405, data bus 2 input connection 406, weight-on-wheels switch 407, an optional discrete input connection ("IN 3," not used in FIG. 4), and even the discrete ground from the activation of the mechanical switch 409.

The processing and control provided by the exemplary configuration of an illuminated pushbutton switch 400 includes the ability to monitor the weight-on-wheels line in order to determine whether processing of data on the data bus(ses) 1 and 2 should be performed. Altitude and temperature data on both busses may be monitored and an ongoing binary differential compare of the data on the busses may be performed, with a differential compare result that is out of range used to detect that at least one of the systems has failed. In that circumstance, a discrete output may be activated to cause the associated indication to either illuminate or start blinking and the discreet OUT 3 to activate a buzzer.

The processing and control provided by the exemplary configuration of an illuminated pushbutton switch 400 also includes detecting, via the "IN 1" input to controller 404, when the switch is pressed, in order to change the illumination to steady and turn off the buzzer. Otherwise, the visual and audible indications may remain lit/flashing and buzzing until the data is back in the correct range. Unused inputs to the controller 404 (e.g., "IN 3" in the example shown) may be disabled.

In this manner, the processing and control provided by the exemplary configuration of an illuminated pushbutton switch 400 is beneficial for any application that needs to monitor up to two data busses and/or up to three discrete inputs, and/or produce a discrete output. Every application that involves some permutation of those inputs and outputs can use the same exact design by using a different command set, which is qualified once for all such applications.

Figure 5:
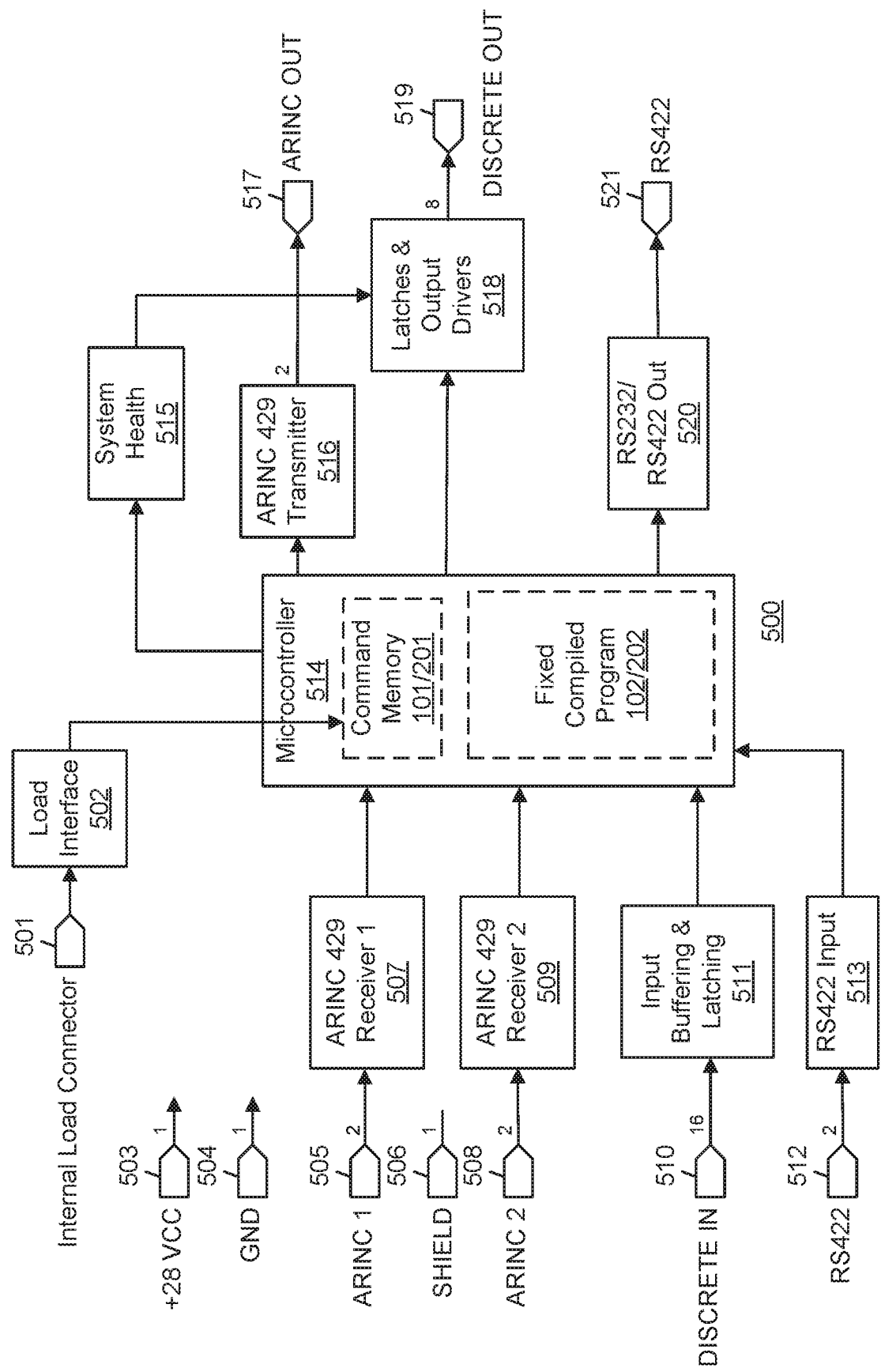
FIG. 5 is a diagram for a typical ARINC 429 transceiver application for the command set and command interpreter or command parser architecture shown in FIGS. 1 and 2.

FIG. 5 is a diagram for a typical Aeronautical Radio, Inc. ("ARINC") ARINC-429 transceiver application for the command set and command interpreter or command parser architecture shown in FIGS. 1 and 2. In the ARINC-429 transceiver 500 depicted, an internal load connector 501 is coupled by a load interface 502 to microcontroller 514. Power ("+28 VCC") connection 504, ground connection 504, and shield connection 506 are provided and connected as necessary (connections not shown for clarity). ARINC 1 input 505 and ARINC input 508 are coupled by ARINC 429 receiver 1 507 and ARINC 429 receiver 2 509, respectively, to microcontroller 514. A discrete input connection 510 is coupled by input buffering and latching unit 511 to microcontroller 514, and an RS422 connection 512 is coupled by RS422 input buffer 513 to microcontroller 514. A system health watchdog 515, which monitors the operation of the microcontroller 514 to provide a failsafe for safety purposes, may be connected between microcontroller 514 and latches and output drivers 518 and, in some embodiments, may enable or disable transmission of signals on the discrete output connector 519 from the microcontroller 514. In other embodiments, the system health watchdog 515 may provide a dedicated output independent of the microcontroller-controlled latches and cannot directly control enable or disable transmission of signals. ARINC 429 transmitter 516 receives an output from microcontroller 514 for transmission on ARINC output connection 517, and RS232/RS422 output unit 520 receives a signal from microcontroller 514 for transmission on the RS422 output connection 521.

Implementation of this configuration within an avionics unit provides the benefit of being able to have larger package sizes and/or more connectors, to monitor and control more information. The use of ARINC-429 transceiver 500 as an avionics unit has a number of enhancements over the current state of the art of traditional avionics units, including: text based command set allowing the unit to be reconfigured without having to reprogram, and to apply reconfigurable control that can be adapted during the development phase of an aircraft; and a single design configuration that can perform different functions by simply loading a different command set, while also allowing a single common part number to be stocked and configured to the appropriate application as needed.

Although the above description is made in connection with specific exemplary embodiments, various changes and modifications will be apparent to and/or suggested by the present disclosure to those skilled in the art. It is intended that the present disclosure encompass all such changes and modifications as fall within the scope of the appended claims.

What is claimed is:

1. An apparatus, comprising:
   one of an aircraft control or an aircraft interface unit, including:
      one or more input connections configured to receive at least one of signals from a data bus, a discrete input, or an analog input,
      one or more output connections configured to transmit at least one of signals onto a data bus, a discrete output, or an analog output, and
      a controller coupled to the one or more input connections and the one or more output connections and including
         a command memory configured to store a command set for selectively configuring and controlling the apparatus upon execution by the controller, and
         a command interpreter configured to receive the command set from the command memory and generate control signals to selectively one of configure or control the apparatus based on signals from the one or more input connections.

2. The apparatus of claim 1, wherein the command set is executed as a loop.

3. The apparatus of claim 1, wherein the command set is executed as a continuous loop.

4. The apparatus of claim 1, wherein the controller comprises an execution memory storing an executable version of each command within the command set.

5. The apparatus of claim 1, wherein the controller comprises command functions and interface drivers configured to one or more of execute functions or establish settings.

6. The apparatus of claim 1, wherein the control signals generated by the command interpreter are output on the one or more output connections.

7. The apparatus of claim 1, further comprising:
   a loader interface configured to load the command set into the command memory; and
   one of input buffers or input latches coupled to the one or more input connections and configured to pass digital or analog signals to the controller.

8. The apparatus of claim 1, further comprising:
   one of output buffers or output latches coupled to the one or more output connections and configured to pass digital or analog signals from the controller; and
   a system health watchdog configured to monitor operation of the controller.

9. The apparatus of claim 1, wherein the one of an aircraft control or an aircraft interface unit is an illuminated pushbutton switch, the illuminated pushbutton switch further comprising a mechanical switch.

10. The apparatus of claim 1, wherein the one of an aircraft control or an aircraft interface unit is a radio transceiver, the radio transceiver further comprising at least one receiver and a transmitter.

11. An apparatus, comprising:
   one of an aircraft control or an aircraft interface unit, including:
      one or more input connections configured to receive at least one of signals from a data bus, a discrete input, or an analog input;
      one or more output connections configured to transmit at least one of signals onto a data bus, a discrete output, or an analog output;
      a controller coupled to the one or more input connections and the one or more output connections and including
         a command memory storing a command set for selectively configuring and controlling the apparatus upon execution by the controller, and
         a command parser receiving the command set from the command memory and storing an executable command set that is used in generating control signals to selectively one of configure or control the apparatus based on signals from the one or more input connections.

12. The apparatus of claim 11, wherein the command set is executed as a loop.

13. The apparatus of claim 11, wherein command set is executed as a continuous loop.

14. The apparatus of claim 11, wherein the controller comprises an execution memory storing an executable version of each command within the command set.

15. The apparatus of claim 11, wherein the controller comprises command functions and interface drivers configured to one or more of execute functions or establish settings.

16. The apparatus of claim 11, wherein the control signals generated by the command parser are output on the one or more output connections.

17. The apparatus of claim 11, further comprising:
   a loader interface configured to load the command set into the command memory; and
   one of input buffers or input latches coupled to the one or more input connections and configured to pass digital or analog signals to the controller.

18. The apparatus of claim 11, further comprising:
   one of output buffers or output latches coupled to the one or more output connections and configured to pass digital or analog signals from the controller; and
   a system health watchdog configured to monitor operation of the controller.

19. The apparatus of claim 11, wherein the one of an aircraft control and an aircraft interface unit is an illuminated pushbutton switch, the illuminated pushbutton switch further comprising a mechanical switch.

20. The apparatus of claim 11, wherein the one of an aircraft control and an aircraft interface unit is a radio transceiver, the radio transceiver further comprising at least one receiver and a transmitter.

* * * * *